(12) United States Patent
Landrock

(10) Patent No.: US 7,505,945 B2
(45) Date of Patent: Mar. 17, 2009

(54) ELECTRONIC NEGOTIABLE DOCUMENTS

(75) Inventor: Peter Landrock, Aarhus (DK)

(73) Assignee: Cryptomathic A/S, Aarhus C (DK)

( * ) Notice: Subject to any disclaimer, the term of this patent is extended or adjusted under 35 U.S.C. 154(b) by 466 days.

(21) Appl. No.: 09/747,511

(22) Filed: Dec. 20, 2000

(65) Prior Publication Data
US 2001/0016838 A1 Aug. 23, 2001

Related U.S. Application Data

(63) Continuation of application No. 08/894,603, filed on Jan. 20, 1998, now abandoned.

(51) Int. Cl.
G06Q 99/00 (2006.01)
(52) U.S. Cl. .................. 705/80; 705/51; 713/176; 713/194
(58) Field of Classification Search .......... 705/69, 705/41, 54, 52, 80, 51; 283/72; 38/40
See application file for complete search history.

(56) References Cited

U.S. PATENT DOCUMENTS

| | | | | |
|---|---|---|---|---|
| 5,001,752 A | * | 3/1991 | Fischer | 713/178 |
| 5,148,481 A | * | 9/1992 | Abraham et al. | 380/46 |
| 5,214,700 A | | 5/1993 | Pinkas et al. | 380/25 |
| 5,224,162 A | * | 6/1993 | Okamoto et al. | 705/69 |
| 5,224,166 A | * | 6/1993 | Hartman, Jr. | 713/190 |
| 5,319,705 A | * | 6/1994 | Halter et al. | 705/54 |
| 5,354,097 A | * | 10/1994 | Tel | 283/72 |
| 5,396,558 A | * | 3/1995 | Ishiguro et al. | 705/67 |
| 5,557,518 A | * | 9/1996 | Rosen | 705/69 |
| 5,590,038 A | * | 12/1996 | Pitroda | 705/41 |
| 5,606,609 A | * | 2/1997 | Houser et al. | 713/179 |
| 5,644,727 A | | 7/1997 | Atkins | 395/240 |
| 5,724,425 A | * | 3/1998 | Chang et al. | 705/52 |
| 5,748,737 A | * | 5/1998 | Daggar | 705/41 |

FOREIGN PATENT DOCUMENTS

| | | |
|---|---|---|
| JP | 6-162059 | 6/1994 |
| WO | WO92/03000 | 2/1992 |

OTHER PUBLICATIONS

"Electronic Data Interchange" United Nations Commission on Internation Trade Law, Working Group on Electronic Data Interchange Thirtieth session, Vienna, Feb. 26-Mar. 8, 1996.*
"Review of Maritime Transport 1998", Chapter VI, Trading Transport Efficiency, United Nations, New York and Geneva 1998 article.*

(Continued)

*Primary Examiner*—Yehdega Retta
(74) *Attorney, Agent, or Firm*—Cesari and McKenna, LLP

(57) ABSTRACT

A method of issuing an electronic negotiable document (END) comprising: creating as data an END and storing this in a tamper-resistant document carrier, the document carrier containing a unique public-secret key pair for signing and verifying and a unique document carrier identifier; signing the unique document-carrier identifier, the END and an END identifier using the secret key of the public-secret key pair and storing the result in the document carrier.

4 Claims, 3 Drawing Sheets

NEGOTIATION

| Stage | SELLER, using D-$C_A$ | | BUYER, using D-$C_B$ |
|---|---|---|---|
| 1 | | <— | Send public key $P_B$ cert. $C_B$ |
| 2 | Verify Certificate $C_B$ | by D-$C_A$ | |
| 3 | Specify D(j), S(i) | input | |
| 4 | Verify flag = 1 | by D-$C_A$ | |
| 5 | Encrypt specified END record M under $P_B$ to generate ciphertext C | | |
| 6 | Set flag = 0, send C, END and certificate of Issuer (j) | —> | |
| 7 | | by D-$C_B$ | Decrypt C |
| 8 | | by D-$C_B$ | Verify issuer's signature |
| 9 | | by owner | Check validity period |
| 10 | | | Store in new END record |
| 11 | | | Increment counter, set flag = 1 |

OTHER PUBLICATIONS

Picking up the pace: trade automation is on the way. (Latin America Trade Finance 1995-1996) Chavez, John; LatinFinance, n70, pTF24(4); Sep. 1995.*

Ed. on EDI; Financial Technology Insight, Nov. 1994.*

Bolero Changing the Face of International Trade?, Financial Technology Insight, Oct. 1994.*

Bolero trade steps. (EU-sponsored project on the digitization of international trade finance) Talmor, Sharona; Banker, 145, 828, 72(3) Feb., 1995.*

"Universal Electronic Cash", Tatsuaki Pkamoto and Kazuo Ohta. NTT Laboratories, Nippon Telegraph and Telephone Corporation, pp. 324-337.

"Smart Cards, Digital Signatures and Negotiable Documents", National Physical Laboratory, Teddington, Middlesex, UK, pp. 1-4.

"Digital Payment Systems Enabling Security and Unobservability", Holger Burk and Andreas Pfitzmann. Computers & Security Aug. 8, 1989, No. 5, Oxford, GB, pp. 399-416.

Security in Open Environments, TEDIS II, 87, ver. 15, Jul. 1994.

Mandate-final report: Report for the TEDIS programme, draft version 1.1, Marinade Limited, Feb. 7, 1995.

J.D. Reeve; Commercial in Confidence; Bolero Phase II; Feb. 1994; Deloitte and Touche Europe Services.

Deloitte and Touche; Bolero Final Report; Oct. 6, 1995.

Ake Nilson et al; Final Report: European Trusted Services (ETS) -Results of 1995 TTPS Projects; Apr. 1997; Marinade LTD., London.

Florian Gehrke; New Attempts at Electronic Documentation in Transport Bolero-The end of the experiment, the beginning of the future?; Apr. 15, 2001; University of Cape Town, Faculty of Law.

* cited by examiner

FIG.2

END Generation

| | |
|---|---|
| CREATE CONTENT | END |
| ⇓ | |
| ADD TIMESTAMP | END + T ---> STORE |
| ⇓ | |
| CALCULATE HASH | $h(END + T) = h_1$ |
| ⇓ | |
| INPUT D-C | { END OUTSIDE |
| | $h_1$ INSIDE |
| ⇓ | |
| APPEND DEVICE NO. | $D(j)$ |
| ⇓ | |
| APPEND SEQ. NO. | $S(i)$ |
| ⇓ | |
| (APPEND WM = IDENTIFICATION) | |
| ⇓ | |
| CALCULATE HASH | $h(h_1 + D(j) + S(i) + WM) = h_2$ |
| ⇓ | |
| SIGN HASH | $S_j(h_2)$ |
| ⇓ | |
| STORE | $h(h_1 + D(j) + S(i) + WM), S_j(h_2)$ |
| ⇓ | |
| APPEND COUNTER = "0", FLAG = "1" (SELL) | |

FIG.3

NEGOTIATION

| Stage | SELLER, using D-$C_A$ | | BUYER, using D-$C_B$ |
|---|---|---|---|
| 1 | | <— | Send public key $P_B$ cert. $C_B$ |
| 2 | Verify Certificate $C_B$ | by D-$C_A$ | |
| 3 | Specify D(j), S(i) | input | |
| 4 | Verify flag = 1 | by D-$C_A$ | |
| 5 | Encrypt specified END record M under $P_B$ to generate ciphertext C | | |
| 6 | Set flag = 0, send C, END and certificate of Issuer (j) | —> | |
| 7 | | by D-$C_B$ | Decrypt C |
| 8 | | by D-$C_B$ | Verify issuer's signature |
| 9 | | by owner | Check validity period |
| 10 | | | Store in new END record |
| 11 | | | Increment counter, set flag = 1 |

ELECTRONIC NEGOTIABLE DOCUMENTS

This application is a continuation of Ser. No. 08/894,603, filed Jan. 20, 1998, now abandoned.

This invention relates to methods and devices for the issue and negotiation of electronic negotiable or quasi negotiable documents (END), and is particularly relevant to systems which are sufficiently secure in open environments. The purpose is to replace paper documents such as cash, bank cheques and bills of lading with freely-transmissible electronic data.

The goal to achieve is that an electronic document—or rather, an electronic realisation of a document—at any particular time can be proved to be the (temporary) property of a particular user. This is clearly required for what is known as negotiable or quasi-negotiable documents. The most interesting examples in trading are Bills of Lading, apart from cash and cheques. The main requirement is thus that these documents be unforgeable.

With ordinary paper documents, the problem is solved by giving the original of a document certain physical attributes that are difficult to reproduce. With this precaution, it makes sense to speak of the original of a document, and define the owner simply as the person holding the original. An electronic (quasi)-negotiable document will in the following be denoted by END.

The important property required is apparently that of uniqueness. The problem is to find a suitable attribute on an electronic document which somehow would give it the property of uniqueness, explicitly or implicitly.

Obviously, the concept of an original does not make sense for electronic documents, and other (e.g. cryptographic) methods must ensure that the owner of a particular electronic document can be identified. One question is to what extent this will involve a trusted third party (TTP).

Any document of some value must initially be generated by someone, who will guarantee this value. This requires the proof of, or non-repudiation of, origin service, which is a well known art and realized using digital signatures.

The question now is how to develop a protocol to cover the situation, where an END, once issued, is to change hands. The main problem is to ensure, that the new owner is uniquely identified, or, in other words, that the seller cannot circumvent the measures and sell the same END to two different entities.

It is now generally recognized that this could only be achieved using cryptographic techniques, in the sense that violation will be detected. Further, it is necessary to use tamper resistant document carriers, such as smart cards (plastics cards containing an integrated circuit) or workstations. "Tamper-proof" or "tamper-resistant" means that the functionality of the device cannot be changed, and that any attempt to do so can be readily detected; in many cases, the device would simply be destroyed by tampering.

One obvious solution would be to introduce a trusted third party (TTP) to register at all times the possession of a particular document, but this would leave the TTP with heavily liability burdens, and is not a popular solution.

Another solution would be to represent each END with a unique chip card, but transfer of the END would necessitate physical transfer of the chip card, which in many cases would be impractical.

The only other way to provide uniqueness is physically to prohibit free copying. This would involve tamper resistance to realize a protected communication with restricted functionality, if possible.

It is known to provide an encryption technique which ensures uniqueness in the transfer of data between two devices. Such a technique is described for example in "New Directions in Cryptography", W. Diffie and M. Hellman, IEEE IT 22 (1976), 644-654. Briefly, each device stores a unique pair of codes known as the public key and the secret key. These constitute a set of matching keys with an underlying algorithm. Such algorithms include RSA and DSA, which are described respectively in U.S. Pat. Nos. 4,405,829 (R. Rivest, A. Shamir and L. Adleman) and 5,231,668 ("Digital Signature Algorithm", by D. Kravitz). The secret key S can be used to provide in effect a digital signature S(D) on input data D. The corresponding public key P can then be used to verify that the input for S(D) must have been S and D. Data from a seller's document carrier, for example, can be encrypted using the public key P of the buyer's document carrier, transmitted to the buyer, and then decrypted using the buyer's secret key, if the public key scheme is of encryption type.

The basic principle for achieving uniqueness here is simple but fundamental: A message encrypted under a key known to only one entity is unique, as long as it is encrypted, and establishes undisputable ownership by the mere fact that it will only be useful to the owner of the key. Only the person in possession of the right key can make any use of the document, which in effect is the property of uniqueness.

On the other hand, the only way the rightful owner can verify that the right END has been encrypted by his key is by decrypting it. But this will give him access to the message and he may subsequently be able to "sell" it to two different persons by encrypting it with their respective keys. A purpose of the invention is to provide a way of avoiding this. This requires tamper resistant hardware, perhaps a chipcard, or a hardware protected PC. In the following, this hardware and equivalent hardware will be called the DOC-carrier, or D-C when abbreviated. Its properties will be described in detail below.

The invention provides a system with the following properties:

An END (or at least the digital signature component of the END) is generated electronically, for instance by using non-repudiation of origin, in a tamper resistant unit and then loaded onto a DOC-carrier (if not the same). As mentioned, this requires some care. It is essential that the signature thus appended to provide the non-repudiation is never disclosed. (It would of course suffice to represent the END by a hash value and the generating digital signature inside the DOC-carrier if storage is a problem). The message itself does not need to be protected.

More specifically, an END (or at least the signature component) is transferred from one DOC-carrier to another, through a public unprotected network, in such a way that 1. It can only be transferred as a meaningful document to one particular DOC-carrier, which nevertheless can be chosen from any number of registered DOC-carriers 2. Recovery is possible, if the transfer is unsuccessful 3. The protocol cannot be completed by any other device than an authorized DOC.

The system should be completely open to communication between any two DOC-carriers, without bilateral agreements.

In order that the invention may be better understood, an embodiment of the invention will now be described, with reference to the accompanying drawings, in which:

FIG. 2 is a schematic flow diagram of the generation of an END; and

FIG. 3 is a schematic flow diagram of the negotiation of an END.

Figure 1:
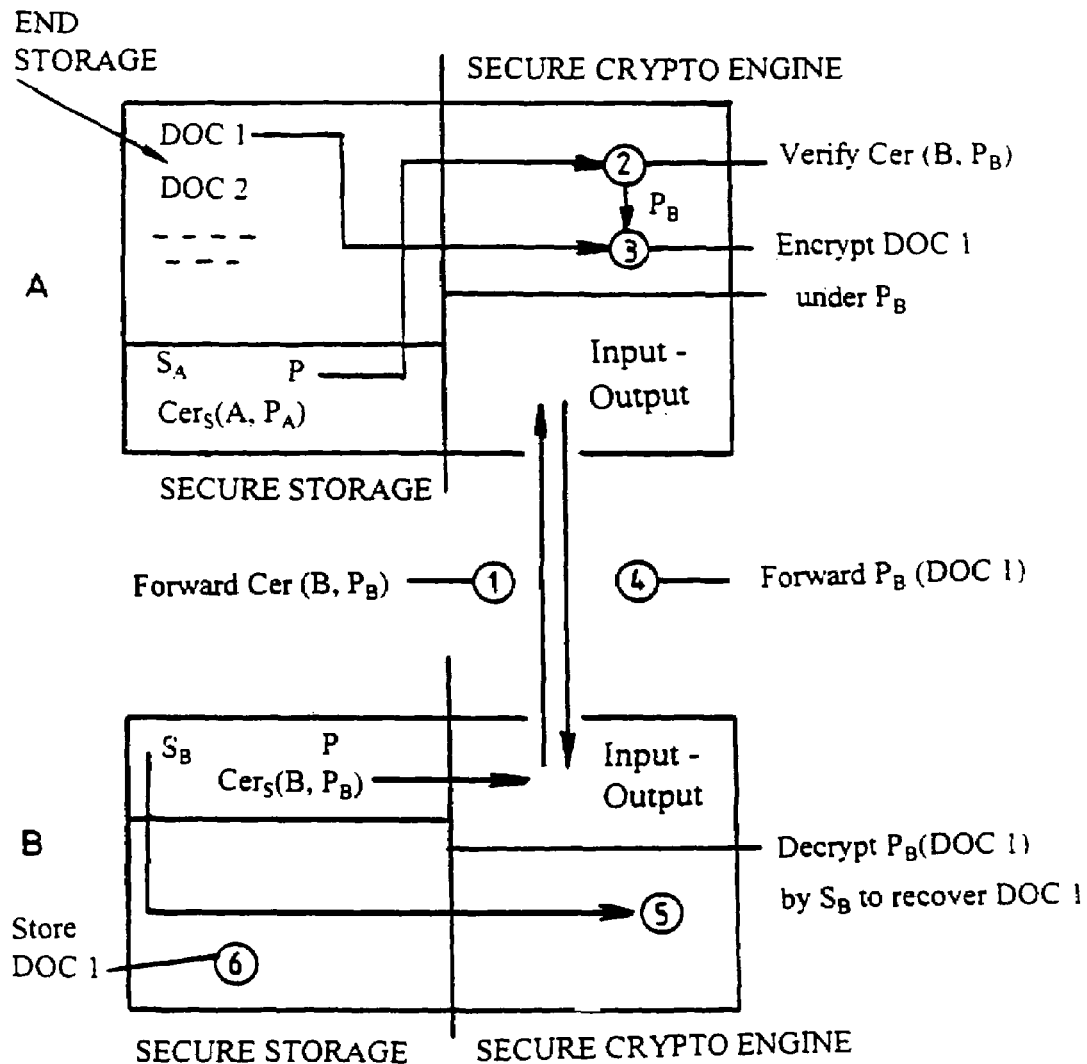
FIG. 1 is a diagram illustrating, by way of an overview, the negotiation of an END between two document carriers, showing the main components of the document carriers.

Each DOC-carrier "possesses" a public key pair. The secret key of this pair must not even be known to the owner of the DOC-carrier. It would be required to realize this in such a way that not even the system provider knows the DOC-secret keys. Thus the secret key must be generated on the DOC-carrier and never leave it unprotected. The DOC-carrier itself should be freely available, but stationary, and certified by some Certification Authority along the lines of the X.509 security architecture.

The END consists of the information as represented in an electronic message, and the corresponding digital signature, calculated by means of the secret key of the issuer and—typically—a hash value of the electronic message. The format could for instance be a special EDIFACT message for the electronic message, whereas the signature will be calculated and stored securely on the DOC-carrier.

Now, the problem is that this shall only be released through a selling process to another DOC-carrier. So the question is, how can one DOC-carrier identify another?

The most attractive solution seems to be the following approach: A trusted party called the Certification Authority CA, authorizes all DOC-carriers in the following manner: The public key of the CA is installed on the DOC-carrier, as well as the secret DOC-carrier key, in a ROM, and in such a way that the secret key cannot be disclosed. Moreover, when a document, or rather the accompanying key protected signature is entered on the DOC-carrier, the DOC-carrier software must ensure that it can only be realised again encrypted under a public key certified by the CA secret key (and verified by means of the corresponding public key on the DOC-carrier). The point behind this is that it will prevent the use of a non-authorized DOC-carrier to get access to the vital signature on an END, which defines that particular negotiable electronic document. In particular this encrypted message is useless excepted when imported into the DOC-carrier holding the corresponding secret key. It is thus important to realize that the value of the negotiable document is represented by the digital signature of the issuer.

Furthermore, and this is an essential property, such an encryption of a particular END on an individual DOC-carrier can take place only once, or rather, once a public key has been selected, it is impossible at any later stage to go through the same procedure with another public key.

Such a system would solve the problem of uniqueness in general—provided it works in practice. The difficult part, which also requires a careful analysis, is to recover from failure. In other words, the problem has been reduced to that of availability.

First of all the DOC-carrier may go down. The only way to recover from that is to have the same information on a backup DOC-carrier. This requires that a protocol is developed, which ensures that the back-up card cannot be used to sell the END to a different entity. Another possibility is to demand that whenever a back-up copy is required, the CA must be contacted.

Secondly, something may go wrong with the encryption in a selling process. This will be easy to recover from, by encrypting once again under the same public key. The use of certificates will ensure with extremely high probability that the public key used for encryption is correct.

Thirdly, something may go wrong in the data transmission from one DOC-carrier to another. But this is handled by re-transmission. The encrypted version of an END needs not be protected. In particular, a totally insecure network may be used to exchange the encrypted END.

Finally, something may go wrong in the receiving DOC-carrier. This may best be handled by a back-up card, with special procedures for recovery.

The functionality of the DOC-carrier is explained in FIG. 1. With the notation of the discussion above, this gives an overview of the design of a DOC-carrier.

The general principle of the protocol between two DOC-carriers A and B is represented in the following sequence, the numerical stages 1 to 6 of which are shown in FIG. 1:

1. The certificate of B is forwarded to A
2. A verifies the certificate of B
   If this is successful,
3. A encrypts the relevant electronic END (or rather, the defining signature) with the public key of B and
4. forwards this to B
5. B decrypts with its secret key $S_B$ and is now the owner of the END
6. B stores the END (or rather, the defining signature) as DOC 1.

The main content of DOC 1 may be transmitted separately from one workstation to another; it does not matter that there may be insufficient memory in the DOC-carrier for the whole of DOC 1, because it is only necessary to store and encrypt the signature portion.

The following is a more detailed description of the generation and negotiation of an END.

The basic protocol for issuing an END and for negotiating that END from its original document carrier to subsequent document carriers is described in the annexed Tedis II B7 document. This gives examples of a document carrier in the form of a chip card containing memory and a program, in a tamper-resistant format. This document also describes the role of a Trusted Third Party in the certification of the document carriers including their original programming with public-secret key pairs, and the tracing of negotiations between document carriers. One important benefit of the present invention is that the role of the Trusted Third Party is minimized, in that it is not necessarily involved directly in the performance of a negotiation of an END between buyer and seller. In other words, no third party need be involved in the actual negotiation protocol. It is also an important benefit of the invention that each END can be negotiated only from one document carrier to one other document carrier, and only once (the system is arranged that the seller can, in future, receive the END back again, but only as a result of a genuine transaction: the system achieves this by counting the number of transactions for each END, and this is described in more detail below).

In this description, the party, such as a bank, which issues the END, is known as the issuer. The issuer has a public-secret key pair, of which the secret key is used to sign the END. The END consists of a bit string which can be read by conventional coding rules, such as ASCII characters written in English. The END is not complete until it is signed by the issuer. As indicated above, a public-secret key pair consists of a set of matching keys P and S with an underlying algorithm. A Trusted Third Party initializes the document carriers of the system, and each document carrier is initialized with a public-secret key pair for signature generation and verification, and a public-secret key pair for encryption and decryption, unique to the device. However, the two public-secret key pairs can be identical, i.e. can be used for both purposes. This depends partly on whether the document-carrier is used for issuing as well as for negotiation: the public key pair for issuing can be different from that for negotiation. Each document carrier is identified by a unique device number or identifier, referred to as the No (D-C).

Each document carrier is given to one legal person, called the owner. The buyer of an END is the document carrier in current possession of the END. The seller is the document carrier which is to take position of the END from a buyer through the protocol. The validity period of each END is the interval between the time of issue and the time that the issuer requires it to expire. The time of issue is recorded as a time stamp with the END.

As indicated above, each document carrier must be tamper resistant, with a limited functionality. It could take the form of a specially designed chip card, or an enhanced work station. The digital signature could typically be stored in an EEPROM, or some sufficiently protected memory.

The Trusted Third Party (TTP) has its own public-secret key pair, of which the public key P is installed on each document carrier. Further, a certificate, consisting of a digital signature of the device number No (D-C) and of the public key of the document carrier, is installed on the document carrier, for each of its public key pairs.

In the case of bank cheques for example, an electronic "water mark" is added to each END upon creation.

Normally, the document carrier upon which the END is issued has the electronic watermark stored on it, for addition to the END upon issue.

In the detailed description which follows of the issue and negotiation of an END, reference is made to the hash value of data. This refers to a technique described for example in ISO/IEC IS 10118, "Information Technology-Security Techniques-Hash Functions". The hash function is a representative abbreviation of the original data, and it is used where the hardware dictates economy in the use of storage space. For example, chip cards at present are unable to store much data, and the hash value is used to reduce the amount of encrypted data to be stored.

Examples of END include electronic cash, in which the issuer is called a "Bank", with special equipment for issuing ENDS; here, the document carriers are used for negotiation, not issue. A further example is electronic bank cheques, in which each document carrier comes with a watermark of the Trusted Third Party (again called the "Bank") and each document carrier may be an issuer. A further example is the bill of lading, which is similar to the example of bank cheques, but need not necessarily have watermarks. The same applies to bills of exchange.

Various back-up procedures are possible in any instance, and the TTP involved will then have a copy of the keys of the document carriers. As the buyer always receives the END encrypted under the public key of the device, it will keep copies of the received encrypted information for later recovery by means of the TTP. Thus the negotiation can be recovered later once decryption becomes possible. Alternatively, each document carrier is formed with a duplicate, complete with the unique public-secret key pair (S), certificate and device number; the device number identifies the device which is being backed up by the duplicate. One possibility for this is to have one chip card with two chips, but a more secure solution is to have two independent chip cards or other work stations. Whenever a negotiation takes place, the protocol is duplicated with the backup document carrier. If the primary document carrier should break down, the back up is authorized to sell to the issuer after the expiration time of the END'S which could not be negotiated. In this case, the TTP needs only to keep a copy of the back up device secret key.

A preferred feature for electronic bank cheques is the so-called "splitting" of a purchased cheque. A purchased cheque may be split into two by means of two digital signatures by the buyer. The document carrier verifies that the total amount of the two split parts adds up to the amount of the original. A digital signature is generated by the document carrier and the two separate parts can then be negotiated individually. Subsequently, buyers will have to authenticate not only the issuing signature but also the splitting signature.

The split is performed in the following manner: the original END, as represented in the document carrier of the current owner, may be split into two or several numbered versions, the sum of their values adding up to the value of the original. A split version consists of the original, together with some information such as its value and sequence number, and this is signed with the secret key of the document carrier. If the document carrier has the status of an issuer, the original issuing signature may be deleted to save space.

Any END could be split, even for example a bill of lading, in which case the information could include attributes such as quantities of goods as well as, or instead of, monetary value. An oil cargo for example could be divided, and the electronic bill of lading split accordingly.

With reference now to FIG. 1, an END is issued on a document carrier D-Cj. The content of an END is generated freely in an unprotected environment by any issuer, and the certificate of the issuer is contained in the END together with a time stamp indicating the time of issue. A hash value h1 of fixed bit length is created from the certificated END plus the time stamp, and this is provided as an input to the document carrier.

In the example of bank cheques given in the Annex "Mandate—final report", the document carrier is initialised by one or more banks. The banks personalise the D-C for the user by recording the user's account number etc. and enabling the user to issue a specific number of electronic cheques drawn on that account—these are ENI's (electronic negotiable instruments). The same D-C can be initialised by several banks for respective accounts, and it is an "electronic cheque book".

To create an ENI, the user puts his D-C into a smart-card reader connected to his PC, and he fills in details such as value, payee, period of validity, which appear as blank spaces on his PC screen, adjacent the bank details which appear automatically. The user transfers the message or a hash value of it onto his D-C where it is signed.

At the initiation of the user, therefore, the document carrier performs certain functions which are beyond the control of the user. Specifically, the document carrier adds its device number D(j), which is in one-to-one correspondence with the public key of the device used for verification of digital signatures generated by the device. This device number could form part of the certificate, or it could be for example the upper bits of the public key after the most significant 1. The document carrier then appends the sequential serial number S(i) for the END. In the case of the END being bank cheques, or if otherwise required, the document carrier also appends the watermark WM, which is a bit sequence identifying a certain party such as a bank.

The concatenation of this data is then, if necessary, hashed to produce a hash value h2. The data or the hash value of the data are then signed by the secret key of the document carrier, to produce Sj(h2). This signed value is stored adjacent to the other concatenated data. Next, the document carrier appends to this data the value of a serial counter, set to zero; and the value of a one bit flag, set to one, indicative of whether the END is currently negotiable (value 1) or non negotiable (value 0) from the particular document carrier.

The END has thereby been issued, and made ready for negotiation with another document carrier certified as being part of the system.

The negotiation of this END originating from document carrier D-Cj, between a seller document carrier D-C$_A$ and a buyer document carrier D-C$_B$ will now be described with reference to FIG. 2.

The negotiation involves the seller and the buyer, and may involve a TTP as well, but for tracing only. The seller, which may possess many different ENDS, decides to sell this particular END to the buyer Br. The seller first authenticates the buyer, in Stage 1, by receiving from it the certificate C$_B$, corresponding to the unique public key P$_B$ of the document D-C$_B$. It is transmitted over a public channel in an open environment.

The program on the seller's document carrier D-C$_A$ checks, in Stage 2, whether the certificate C$_B$ is authenticated, and aborts the negotiation if not. It then extracts the public key P$_B$ for future encryption. The seller identifies the negotiability status flag of the particular END it wishes to sell, accessing it, in Stage 3, with the device number D(j) and the END serial number S(i). It then checks in Stage 4 that the flag is 1, and if not it aborts the negotiation. If the END is shown to be negotiable, then further action is not denied, and the full END record or message M is encrypted by means of the public key P$_B$, and sent over the public channel to the buyer.

To ensure that the seller cannot repeat the negotiation of the same END, the negotiability status flag is set to zero, in Stage 6.

On receipt of the encrypted message or ciphertext C corresponding to message M, the buyer decrypts the information using its own secret key S$_B$: this provides the original message M=S$_B$(C). The buyer also requests and receives, in Stage 6, the certificate of the issuer Cer(D-Cj), and the hash value of the original content of the END, and in Stages 7 and 8 it decrypts the message M from the ciphertext C, and it verifies the signature Sj(h2) and the device number D(j) of the issuer. If verification should fail, the buyer informs the issuer and ceases negotiation.

The buyer then checks the timestamp T of the END, and informs the issuer and aborts the negotiation if the timestamp indicates expiration of validity of the END.

The buyer then returns to the seller, through the same open channel, an acknowledgement in the form of a digital signature on the concatenation of the serial number of the END, the generating signature and the counter. It is accompanied by its own certificate C$_B$. A copy may also be returned to the issuer for tracing purposes.

The seller D-C$_B$ verifies the acknowledgment and then outputs the result for information to the seller. The same thing happens at the issuer, if applicable.

In Stage 10, the received information, i.e. the hash value of the content of the END, the device number of the generating END, the serial number of the END, the generating signature and the counter, which is incremented by 1 in Stage 11, is then stored in a new record. It is important to increment the counter, so that each document carrier can recognize that the END has undergone a further negotiation, allowing it to return to a previous document carrier.

The negotiability status flag is then set to 1, to indicate that this END, with this particular counter, has become negotiable.

After a number of negotiations, the END will be presented to the issuer for settlement, whether it is a cheque or cash or whatever. The settlement involves electronic tracing effectively in the reverse direction back to the original issue.

Whilst a specific example has been given to illustrate the different inventions claimed in the following claims, it will be appreciated that the objects of the invention can be realized in different forms, using different software or different hardware. The various different features which have been described in this specification are not all essential, but we claim separate inventions in all possible combinations of such features, within the scope of the claims. For example, although the method of issuing an END and then negotiating that END from the issuing document carrier to a buying document carrier is not claimed separately, this is intended to be a separate invention. Further, features such as the ability to recover from failure, although not claimed specifically, are intended to constitute an invention when combined with other features which are claimed specifically.

The invention claimed is:

1. A method of electronically negotiating an electronic negotiable document, transferred along a chain of sellers and buyers, wherein said electronic negotiable document has a value which is an amount of money or quantity of goods, and wherein said seller is not a bank, the method comprising:

issuing from a trusted supplier said seller with seller tamper-resistant document carrier hardware, said seller tamper-resistant document carrier hardware having its own public-secret key pair, and wherein said secret key is not accessible to said seller, said tamper-resistant document carrier hardware bearing said electronic negotiable document and a signature calculated using said secret key;

issuing from a trusted supplier said buyer with buyer tamper-resistant document carrier hardware, said buyer tamper-resistant document carrier hardware having its own public-secret key pair, and wherein said secret key is not accessible to said buyer;

transferring said electronic negotiable document from said seller tamper-resistant document carrier hardware to said buyer tamper-resistant document carrier hardware;

splitting the original value of said electronic negotiable document electronically in said buyer tamper-resistant document carrier hardware by creating two or more split versions of said electronic negotiable document each with a new sequence number;

inputting to said buyer tamper-resistant document carrier hardware, now acting as a seller tamper-resistant document carrier hardware, values defining values of each new said split version, wherein each new said split version comprises the signature of the original electronic negotiable document, and wherein each new said split version has a value such that the sum of the values of said two or more split versions adds up to said value of said original electronic negotiable document;

digitally signing said split versions using said secret key of said buyer tamper-resistant document carrier hardware acting as a seller tamper-resistant document carrier hardware to generate a splitting signature; and transferring said two or more split versions separately to one or more further buyers without the involvement of a trusted third party;

wherein each of said further buyers is able to transfer a said split version to one or more buyers in the chain.

2. The method as claimed in claim 1 wherein said seller and said buyer tamper-resistant document carrier hardware each have a document carrier identifier, and wherein each said document carrier identifier is signed by a said secret key.

3. The method as claimed in claim 1 wherein said seller tamper-resistant document carrier hardware bears an issuing signature, and wherein said transferring includes transferring said issuing signature from said seller tamper-resistant document carrier hardware to said buyer tamper-resistant document carrier hardware.

4. The method as claimed in claim 3 further comprising deleting said issuing signature after said transferring.

* * * * *